United States Patent [19]

Bruns et al.

[11] 3,987,145
[45] Oct. 19, 1976

[54] FERRIC ION AS A SCAVENGING AGENT IN A SOLVENT EXTRACTION PROCESS

[75] Inventors: Lester E. Bruns, Kennewick; Earl C. Martin, Richland, both of Wash.

[73] Assignee: The United States of America as represented by the United States Energy Research and Development Administration, Washington, D.C.

[22] Filed: May 15, 1975

[21] Appl. No.: 577,821

[52] U.S. Cl. .......................... 423/10; 252/301.1 R; 260/439 R; 423/11
[51] Int. Cl.² .................. B01D 11/04; C07F 15/02
[58] Field of Search ...................... 423/10, 11, 140; 252/301.1 R; 260/429.1, 439 R

[56] References Cited
UNITED STATES PATENTS

| | | | |
|---|---|---|---|
| 2,815,262 | 12/1957 | Bridger et al. | 423/10 |
| 2,885,260 | 5/1959 | Maraman et al. | 423/10 X |
| 2,990,240 | 6/1961 | Ellison et al. | 423/10 |
| 3,112,275 | 11/1963 | Pollock et al. | 423/10 X |
| 3,214,239 | 10/1965 | Hazen et al. | 423/10 |
| 3,378,352 | 4/1968 | Hansen | 423/10 |
| 3,387,945 | 6/1968 | Boudry et al. | 423/10 |
| 3,463,619 | 8/1969 | Ritter et al. | 423/10 |
| 3,574,532 | 4/1971 | Schulz | 423/10 |
| 3,708,508 | 1/1973 | Schulz | 423/10 X |

*Primary Examiner*—Richard E. Schafer
*Attorney, Agent, or Firm*—John A. Horan; Arthur A. Churm; Hugh W. Glenn

[57] ABSTRACT

Ferric ions are added into the aqueous feed of a plutonium scrap recovery process that employs a tributyl phosphate extractant. Radiolytic degradation products of tributyl phosphate such as dibutyl phosphate form a solid precipitate with iron and are removed from the extraction stages via the waste stream. Consequently, the solvent extraction characteristics are improved, particularly in respect to minimizing the formation of nonstrippable plutonium complexes in the stripping stages. The method is expected to be also applicable to the partitioning of plutonium and uranium in a scrap recovery process.

7 Claims, 1 Drawing Figure

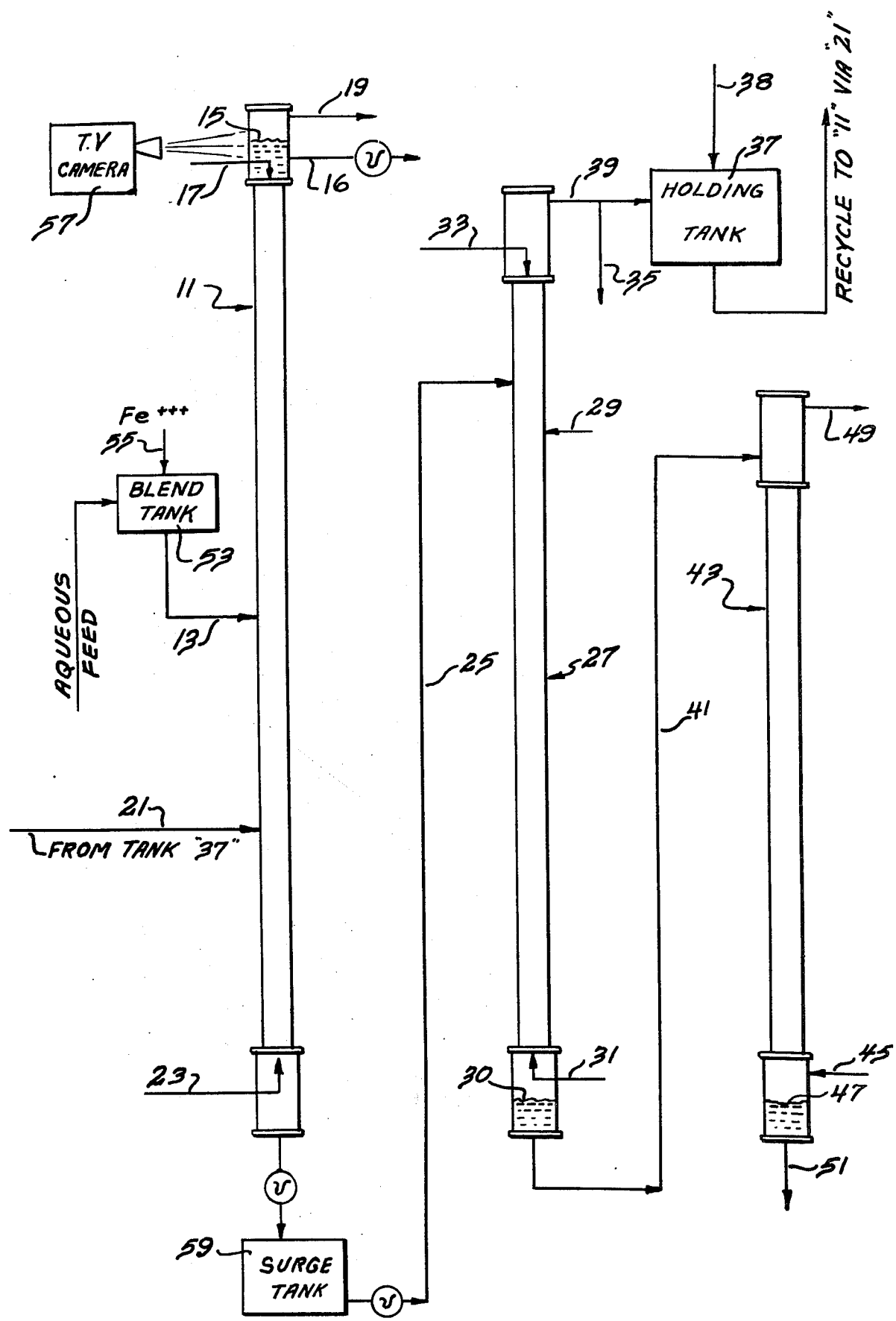

«3,987,145»

FERRIC ION AS A SCAVENGING AGENT IN A SOLVENT EXTRACTION PROCESS

CONTRACTUAL ORIGIN OF THE INVENTION

The invention described herein was made in the course of, or under, a contract with the U.S. ENERGY RESEARCH AND DEVELOPMENT ADMINISTRATION.

BACKGROUND OF THE INVENTION

This invention relates to a method for improving the extraction of plutonium with tributyl phosphate. More particularly, it relates to a method for improving the degree to which plutonium ions can be stripped from an organic to an aqueous solution by the removal of radiolytic degradation products of tributyl phosphate which would otherwise form nonstrippable plutonium complexes and precipitates.

Solvent extraction processes are in wide use for the reprocessing of spent fuel from nuclear reactors as well as actinide scrap material generated in the fabrication of nuclear fuel elements. Tributyl phosphate (TBP) in an organic solvent base or diluent, e.g., kerosene or carbon tetrachloride, is often employed to extract the actinides from the fission products or other impurities. This process is generally referred to as the Purex Process and is described in "Reactor Handbook," 2d Edition, Volume II, "Fuels Reprocessing," Stoller and Richards, Interscience, 1961. A more particular process to which the present invention is applicable is described in *Chemical Engineering Progress Symposium Series*, Vol. 63, No. 80, L. E. Bruns, "Geometrically Favorable Plutonium Scrap Recovery Plant," pp. 156-162, 1967. In order to partition the actinide values, this process relies on the propensity of uranyl nitrate to be held in the organic phase by tributyl phosphate while plutonium-III is stripped into an aqueous phase.

The use of tributyl phosphate as an extractant for uranium and plutonium has a widespread acceptance in the nuclear industry for the past 25 years. This material, nevertheless, suffers from both chemical and radiological degradation when exposed to the radioactive solutions containing extractable actinides. The presence of the degradation products such as the dibutyl phosphate (DBP), monobutyl phosphate (MBP) and phosphoric acid has a detrimental effect upon the extraction process. Among the problems created by the presence of these materials are poor phase separation in the contactor or column with subsequent losses by entrainment, reduced throughput, extraction of fission products along with the actinides and the inability to partition actinides caused by the formation of nonstrippable complexes and precipitates in the organic phase.

Previous techniques to remove degradation products from tributyl phosphate have included carbonate scrub solutions, the use of macrorecticular ion exchange resins and others such as a reduction scrub with hydrofluoric acid. All of these techniques involve the use of extra process equipment and chemicals along with the disposal of the additional radioactive waste. With the use of carbonate scrubs, the concentration of degradation products rises to a level such that the entire organic stream must periodically be discarded. Hydrofluoric acid brings with it the risk of $PuF_4$ precipitation. All of these treatment techniques are expensive. An ideal solution to these problems would be one which would minimize the formation of these degradation products or permit their removal at an early point in the process.

SUMMARY OF THE INVENTION

Therefore, in view of these problems associated with prior art processes, it is an object of the present invention to provide a method for the early removal of tributyl phosphate degradation products from a solvent extraction process.

It is a further object to provide for the improved partitioning of uranium and plutonium values by minimizing the formation of plutonium-dibutylphosphate complexes and precipitants.

It is also an object of this invention to improve the recovery of plutonium in a plutonium scrap recovery process.

In accordance with the present invention, ferric ions are added into the aqueous feed solution of a solvent extraction process employing tributyl phosphate in an organic base for the recovery and partitioning of actinide values. The process includes an extraction unit or process portion in which substantially all of the actinide values are extracted from the aqueous feed into the organic, and a subsequent process unit or portion in which at least one species of the actinide values is stripped into an aqueous strip solution. Precipitates formed of iron and degradation products of tributyl phosphate are removed from the extraction portion of the pocess to enhance the stripping or partitioning of values in the subsequent portion as well as the extraction characteristics of the tributyl phosphate.

DESCRIPTION OF THE DRAWINGS

The present invention is illustrated in the accompanying drawing which is a schematic flow diagram of a solvent extraction process for the recovery and partitioning of actinide values.

DETAILED DESCRIPTION OF THE PREFERRED EMBODIMENT

The improved solvent extraction process of the present invention was tested in the laboratory and in pilot-plant operations with feed streams formulated to simulate a plutonium scrap recovery process. It will be clear, however, that this improvement is applicable to both processes for the recovery of plutonium alone and to processes for the partitioning of uranium and plutonium.

Accordingly, the invention is described hereinbelow as an improvement to a plutonium-uranium partitioning process used in the recovery of these actinides from scrap materials. One such partitioning process is completely described in "Plutonium-Uranium Partitioning by a Reflux Solvent Extraction Flowsheet," L. E. Bruns, ARH-SA-130, Atlantic-Richfield Hanford Company, 1972. This report is hereby expressly incorporated by reference.

Referring now to the drawing where there is shown a series of three columnar units. Each of these units can be either a packed or sieved plate column to permit continuous contact between an aqueous and an organic flow. Alternatively, the units can be a series of mixer-settler devices to effect similar liquid-to-liquid contact. The first unit 11 is employed for the extraction of substantially all of the actinide values from the aqueous feed solution into an organic phase containing tributyl phosphate. The process as described employs organic streams of greater density than the aqueous (for example, 15 to 20 volume percent TBP in CCl₄ or trichlorobenzene). This first unit will be filled primarily with the organic phase with portions of aqueous phase disbursed throughout. Consequently, the interface 15 between the organic and aqueous phase is located near the top of the unit. Mixing the two phases is enchanced in some systems by introducing air pulses (not shown) at the bottom of each column or unit.

Aqueous feed 13 enters unit 11 at a suitable location towards the unit's center. The feed contains dissolved actinide values along with various cation impurities obtained from the dissolution of scrap generated in the fabrication of nuclear fuel elements. A similar actinide-bearing feed could be provided from the dissolution of fuel and target elements for reprocessing. The feed is most often produced by nitric acid dissolution which ensures a predominance of plutonium-IV with some plutonium-VI species. This valence combination along with the stable uranium-VI species is extractable within about 7 to 8 theoretical stages into the organic phase contaning tributyl phosphate introduced at 17 near the top of the unit. Sufficient stages are used to ensure negligible plutonium and uranium losses in the aqueous salt waste discharge at 19 above interface 15.

The organic phase containing the extracted actinide values is scrubbed to remove any residual impurities with aqueous scrub solutions introduced at 21 and 23 in the lower portion of the unit 11. Scrub solution 21 is refluxed plutonium product with additional nitric acid to remove the bulk of the impurities from the uranium and plutonium in the organic phase. This recycle is also employed to bring the product concentration to the desired level of plutonium. An additional scrubbing solution 23 (e.g., 2 M HNO₃) is added near the bottom of the column to remove the final impurities from the aqueous phase. LThe number of stages will, of course, depend on the degree of impurity removal required. The organic effluent 25 leaving unit 11 flows as feed to a plutonium-uranium partitioning unit 27. Effluent 25 enters unit 27 towards the upper, plutonium-rich section while aqueous strip streams 29 and 31 flow upwardly from the lower section. Column 27 is operated predominantly in aqueous phase with portions of organic disbursed throughout. The organic to aqueous interface 30 is maintained toward the lower end of the unit by keeping the aqueous and organic flows in balance.

An organic scrub solution 33 is introduced at the top of unit 27 leaving a sufficient number of scrub stages above the organic feed stream 25 for removal of the uranium from the plutonium-rich aqueous flow. The number of scrub stages used depend on the desired capacity. Scrub solution 33 ordinarily will be the same as the organic extractant 17, for example, about 20% TBP by volume in carbon tetrachloride.

The upper effluent stream 39 from unit 27 is an aqueous phase including plutonium-III species stripped from the other actinide values in the organic. One fraction of this effluent is withdrawn as a product stream 35, while the remainder is transferred to a holding tank 37. Dilute nitric acid 38 blended with the product in tank 37 oxidizes the plutonium to plutonium-IV prior to returning the solution to the extraction unit as scrub stream 21 described above.

Two aqueous strip solutions 29 and 31 are shown entering the partitioning unit 27 below the entry point of the organic feed stream 25. Each of the strip streams includes a nitric acid solution and a reducing agent for providing and maintaining a sufficiently high concentration of plutonium-III species within this unit. Reductants such as hydrazine or ferrous sulfamate can be used for this purpose but hydroxylamine nitrate (NH₂OH. HNO₃, hereinafter abbreviated as HN) has been found to be preferred as it operates satisfactorily in nitric acid mediums of fairly low concentration. The introduction of aqueous strip solution at 29 just below entry of feed 25 takes into account the autocatalytic breakdown of HN and provides sufficient reducing agent throughout the column to maintain most of the plutonium as the III species. As an example, strip solution 29 can include 1.2 M HN in 1 M HNO₃ and solution 31, 0.2 M HN in 0.15 M HNO₃. (As used herein, the symbol "M" is used to represent moles/liter.)

The partitioning principle in unit 27 is based on maintaining a high concentration (30 to 60 g/l) of predominantly plutonium-III in the scrub section and initial stripping stages. That is, the portion of the unit immediately above and immediately below the entry of organic feed stream 25. The high concentration of plutonium-III nitrate "salts" the uranium into the organic phase. The scrub stream of tributyl phosphate in carbon tetrachloride entering at 33 removes residual uranium quantitatively and generally only a small quantity of plutonium is refluxed to the organic in the scrub section.

An additional unit 43 receives the organic effluent 41 discharged from column 27 for washing out any residual plutonium. The aqueous stripping solution 45 shown entering the bottom of the column will include a dilute solution of nitric acid in hydrofluoric acid, e.g., approximately 2.5 M HNO₃ – 0.25 M HF. Column 43, like column 27, is operated in the aqueous mode with the interface 47 in the lower section. The hydrofluoric acid will quantitatively strip plutonium from compounds such as Pu(NO₃)₄.2DBP. However, the introduction of HF presents a possibility of PuF₄ precipitation within the column with resulting reduced effectiveness in the process.

The aqueous effluent 49 containing recovered plutonium is recycled to column 11 for working. The organic discharge 51, rich in the uranium product, is transferred to a simple water strip system where the uranium is removed for further processing in another facility. Any remaining dibutyl phosphate within the organic stream would ordinarily be removed by use of a carbonate wash in a subsequent operation. The organic flow as thus treated is reacidified and returned to units 11 and 27 as extractant and scrub flows.

The process as thus far described is that of the Plutonium-Uranium Partitioning Process disclosed in the publication cited above. In order to increase the effectiveness of such a process, applicants propose a novel method for removing the major portion of the chemical and radiolytic degradation products of tributyl phosphate, e.g., dibutyl phosphate and monobutyl phospate. The results of such removal will be to minimize or possibly eliminate the need for the final hydrofluoric acid strip of the plutonium values from the organic flow and the carbonate wash of the depleted organic. Not only will this method minimize the need for these additional process steps but will increase the over-all effectiveness of the solvent extraction process by, for instance, preventing the precipitation of plutonium fluoride and dibutyl phosphates within the system along with reducing the potential for column flooding.

In order to implement applicants' invention, suitable means such as a blend tank 53 is provided for adding ferric ions into the aqueous feed. Since the untreated feed will ordinarily be within a nitric acid solution, ferric nitrate can be added as illustrated at 55. Sufficient ferric ions are added to the feed solution to form a solid precipitate of the dibutyl phosphate in solution. Preferably the feed is adjusted to about 0.05 to 0.1 M ferric ion concentration. Concentrations much below about 0.01 M ferric ions will be insufficient to significantly precipitate expected dibutyl phosphate concentrations of about 0.02 molar.

Where concentrations of ferric ions in the feed solution are greater than 0.2 M, iron-dibutyl phosphate precipitates of increased density can be formed and exit with the product stream from unit 11. Such precipitates will follow the organic effluents 25 and 41 through the system and cannot readily be separated. Therefore, it is of importance in the presently described process that the ferric ion concentration be controlled within 0.01 to 0.2 M, preferably 0.05 to 0.1 M. It is also of importance to note that the ferric ions must be added into the feed solution as opposed to a later stream. This permits the dibutyl phosphate to be precipitated as formed without opportunity to complex or precipitate with plutonium values.

It has been found that the resulting iron dibutyl phosphate precipitate is less dense than the organic liquids of about 1.4 to 1.6 gm/cc but yet more dense than aqueous-based liquids of about 1.05 to 1.3 gm/cc used in the process. Consequently, in column 11, this precipitate will accumulate at interface 15 and can be removed at that point through outlet 16. As an alternative, the precipitate can be allowed to accumulate in the upper portion of unit 11 and be carried out with the aqueous waste flow 19. A similar withdrawal of precipitate can be made at the interface in the lower portion of column 27 but it is expected that a major portion of the degradation products will precipitate and be removed from the extraction unit 11.

The accumulation of precipitate at interface 15 can be monitored by any suitable means such as camera 57 and the withdrawal rate controlled accordingly. Interface 15 can be maintained at a near constant level by such as the rate of organic effluent leaving the bottom of unit 11. In order to permit this control and still provide a fairly uniform feed flow to unit 27, a surge tank 59 can be provided in effluent flow 25 between units 11 and 27.

The following examples are presented to illustrate the present invention.

EXAMPLE I

A typical feed solution containing the following composition is fed into a solvent extraction process as described above. The feed contains 2.5 M $HNO_3$, 0.8 M $Al^{+++}$, 0.4 M $AlF^{++}$, 0.4 M $Mg^{++}$, 0.2 M $Ca^{++}$, 0.1 M $Na^+$, 0.2 M other cations, 5.0 g/l $UO_2^-(NO_3)_2$, 10 g/l $Pu(NO_3)_4$ [some $PuO_2(NO_3)_2$] 8.5 M total $NO_3^-$ in aqueous solution. Various of these cations represent radioisotopes that can produce radiolytic degradation of TBP. To this feed is added sufficient ferric nitrate $Fe(NO_3)_3$ to form a 0.1 M ferric ion concentration. The feed solution is contacted within a sieve plate air-pulsed column with a countercurrent flow of 20% by weight TBP in $CCl_4$. Ferric dibutyl phosphate precipitate is withdrawn from the aqueous to organic interface at the column top. The organic effluent discharged from the column bottom containing the extracted actinide values is expected to have no more than about 0.0001 M dibutyl phosphate.

EXAMPLE II

In a pilot-plant test employing mixer-settler units, an aqueous feed solution containing 1.0 M $Al(NO_3)_3.9H_2O$, 2 M $HNO_3$ and 0.05 g/l plutonium along with 0.1 M ferric nitrate is contacted with 20% TBP in carbon tetrachloride. The carbon tetrachloride orginally included a dibutyl phosphate concentration of 0.01 M. After contact with the feed solution and separation of the ferric dibutyl phospate precipitate, the dibutyl phosphate concentration in the organic was reduced by fiftyfold.

EXAMPLE III

In a laboratory test a volume of 20% tributyl phosphate in carbon tetrachloride having approximately 0.02 M dibutyl phosphate is contacted with a 0.2 M ferric nitrate solution. On separation of the two phases, the organic is found to have a 1000-fold reduction in dibutyl phosphate.

EXAMPLE IV

In a laboratory test equal volumes of feed and organic extractant solution were mixed together for about 15 minutes to simulate the column 11 residence time. The feed solution contained about 1.0 M $Al(NO_3)_3 .9H_2O$, 2.0 M $HNO_3$ and plutonium as shown. The organic extractant solution was 20 volume percent TBP in $CCl_4$ with 0.02 M DBP added. The organic phase was separated and contacted in three consecutive, countercurrent, batch steps, each of about 15 minutes, with an equal volume of aqueous stripping solution. The aqueous stripping solution contained 0.15 M $HNO_3$ along with 0.04 M hydroxylamine nitrate in the first run (Run A) and 0.25 M hydroxylamine nitrate in the second run (Run B). The results are given in Table I.

TABLE I

| | | RUN A | | | | | |
|---|---|---|---|---|---|---|---|
| | Initial Feed Plutonium | Strip 1, Plutonium Grams/Liter | | Strip 2, Plutonium Grams/Liter | | Strip 3, Plutonium Grams/Liter | |
| Additive | Grams/Liter | Aqueous | Organic | Aqueous | Organic | Aqueous | Organic |
| None | 0.046 | 0.0002 | 0.043 | 0.00002 | 0.035 | 0.00009 | 0.034 |
| 0.05 M iron to feed | 0.048 | 0.039 | 0.001 | 0.0025 | 0.0002 | 0.0005 | 0.00002 |
| 0.1 M iron to feed | 0.047 | 0.039 | 0.0008 | 0.0002 | 0.0002 | 0.00002 | 0.00003 |
| 0.2 M iron to feed | 0.049 | 0.045 | 0.000003 | 0.003 | 0.00003 | 0.0001 | 0.00003 |
| | | RUN B | | | | | |
| None | 0.046 | 0.0002 | 0.036 | 0.0001 | 0.035 | 0.00007 | 0.031 |
| 0.05 M iron to feed | 0.046 | 0.045 | 0.0007 | 0.0025 | 0.00007 | 0.0002 | 0.00003 |

TABLE I-continued

| | | | | | | | |
|---|---|---|---|---|---|---|---|
| 0.1 M iron to feed | 0.046 | 0.041 | 0.0005 | 0.002 | 0.00008 | 0.0002 | 0.00005 |
| 0.2 M iron to feed | 0.046 | 0.046 | 0.0002 | 0.001 | 0.00002 | 0.00006 | 0.00002 |

The results show that the addition of ferric ions to the feed solution greatly improves the recovery of plutonium from the organic to the aqueous phase and also substantially reduces the concentration of plutonium left in the organic when dibutylphosphate is present.

It can be seen that the present invention provides a method for improving the extractability of actinide values from an aqueous solution. In addition, the partitioning of plutonium from uranium values is also improved by the removal of radiolytic degradation products which would otherwise combine with plutonium ios and render them unseparable from uranium values. The method allows removal of ferric dibutyl phosphate precipitates from the interface of heavy organic and aqueous phases. Consequently, the deleterious effects that have been previously associated with dibutyl phosphate within solvent extraction system can be avoided.

The embodiments of the invention in which an exclusive property or privilege is claimed are defined as follows:

1. In a process for recovering actinide values from an aqueous feed solution containing said values along with cations of lower atomic weight, wherein within a first portion of said process, said actinide values are extracted from said aqueous solution into an organic solvent, said solvent having a greater density than said aqueous solution and containing tributyl phosphate and degradation products of tributyl phosphate, said solvent and aqueous solution forming a liquid-liquid interface within the first portion of said process with said solvent the lower layer and said aqueous solution the upper layer and wherein within a second portion of said process, at least one species of said actinide values are stripped into an aqueous strip solution, the improvement comprising adding ferric ions into said aqueous feed solution and withdrawing the resulting precipitate of said degradation products with ferric ions from said first portion of said process at said interface of said organic solvent and said aqueous solution.

2. The process of claim 1 wherein said ferric ions are added to said aqueous feed solution as $Fe(NO_3)_3$ in sufficient amount to attain 0.01 to 0.2 molar concentration.

3. The process of claim 2 wherein said precipitate is ferric dibutyl phosphate.

4. The process of claim 1 wherein said species of actinide values stripped from the remainder of said values is Pu(III).

5. The process of claim 4 wherein said Pu(III) species is produced from plutonium species of higher oxidation states by the addition of a reductant into said aqueous strip solution within said second portion of said process.

6. The process of claim 5 wherein said reductant is hydroxylamine nitrate.

7. The process of claim 1 wherein said aqueous solution having a density of 1.05 to 1.3 gm/cc, said organic solution having a density of about 1.4 to 1.6 gm/cc, and said degradation product precipitate having a density intermediate the density of said aqueous and organic solutions.

* * * * *